US008793394B2

(12) United States Patent
Yamasaki (10) Patent No.: US 8,793,394 B2
(45) Date of Patent: Jul. 29, 2014

(54) SESSION RELAYING APPARATUS, SESSION RELAY METHOD, AND SESSION RELAY PROGRAM

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 936 days.

(21) Appl. No.: 10/581,397

(22) PCT Filed: Dec. 1, 2004

(86) PCT No.: PCT/JP2004/018236
§ 371 (c)(1),
(2), (4) Date: Aug. 4, 2006

(87) PCT Pub. No.: WO2005/055546
PCT Pub. Date: Jun. 16, 2005

(65) Prior Publication Data
US 2008/0285447 A1    Nov. 20, 2008

(30) Foreign Application Priority Data

Dec. 3, 2003   (JP) ................................. 2003-404831

(51) Int. Cl.
G06F 15/16        (2006.01)
(52) U.S. Cl.
USPC ....................................................... 709/234
(58) Field of Classification Search
USPC .................................. 709/227, 228, 232–235
See application file for complete search history.

(56) References Cited

U.S. PATENT DOCUMENTS 5,715,177 A * 2/1998 Machida et al. ................ 702/62
6,690,645 B1 * 2/2004 Aweya et al. ................. 370/230
7,012,889 B1 * 3/2006 Turner et al. .................. 370/229
2003/0037158 A1 * 2/2003 Yano et al. .................... 709/232
2003/0204601 A1 * 10/2003 Takano ......................... 709/227
2004/0098223 A1 * 5/2004 Conrad ......................... 702/176
2004/0120256 A1 * 6/2004 Park .............................. 370/235

(Continued)

FOREIGN PATENT DOCUMENTS

| JP | 06-290144 | 10/1994 |
| JP | 10-224356 A | 8/1998 |
| JP | 2000-253048 | 9/2000 |
| JP | 2001-094613 | 4/2001 |

OTHER PUBLICATIONS

Jitendra Padhye, Victor Firoiu, Don Towsley, and Jim Kurose"Modeling TCP Throughput: A Simple Model and its Empirical Validation", In ACM SIGCOMM'98.

(Continued)

*Primary Examiner* — Jason Recek
(74) *Attorney, Agent, or Firm* — Sughrue Mion, PLLC (57) ABSTRACT

In a data reception processor (210a) in a session relaying apparatus (20-3), a data amount monitor (201) monitors the data amount within the session relaying apparatus (20-3), a receivable amount calculating unit (212) requires a data receivable amount which is informed from the session relaying apparatus (20-3) to a data transmission terminal (10) in a devaluating way according to a predetermined function, a receivable amount informing unit (213) informs the data transmission terminal (10) of the value, and in the data output processor (220a), an initialization judging unit (223) makes a judgment about initialization of the transmission amount, according to the amount resulting from the data monitor (201) monitoring the data amount within the session relaying apparatus (20-3), and a transmissive amount calculating unit (222) determines the data transmissive amount by using the result.

21 Claims, 7 Drawing Sheets

(56) References Cited

U.S. PATENT DOCUMENTS

| | | | |
|---|---|---|---|
| 2005/0063304 A1* | 3/2005 | Sillasto et al. | 370/229 |
| 2005/0141419 A1* | 6/2005 | Bergamasco et al. | 370/230 |
| 2006/0039285 A1* | 2/2006 | Chapman et al. | 370/235 |
| 2006/0089990 A1* | 4/2006 | Ng et al. | 709/227 |
| 2008/0212965 A1* | 9/2008 | Sisto et al. | 398/68 |
| 2009/0185485 A1* | 7/2009 | Swami | 370/231 |
| 2010/0091652 A1* | 4/2010 | Lin | 370/231 |

OTHER PUBLICATIONS

A. V. Barkre and B. Badrinath, "I-TCP: Indirect TCP for mobile hosts", in Proceedings of the 15th International Conference on Distributed Computing System, pp. 136-143, May 1995.

J. Postel, "Transmission control protocol", RFC793, Sep. 1981.

M. Allman, "TCP Congestion Control", RCC2581, Apr. 1999.

Chinese Office Action dated Jun. 5, 2009.

\* cited by examiner

SESSION RELAYING APPARATUS, SESSION RELAY METHOD, AND SESSION RELAY PROGRAM

This application claims priority from PCT Application No. PCT/JP2004/018236 filed Dec. 1, 2004, and from Japanese Patent Application No. 2003-404831 filed Dec. 3, 2003, which applications are incorporated herein by reference.

FIELD OF THE INVENTION

The invention relates to a session relaying apparatus which relays sessions between a data transmission terminal and a data reception terminal, and to a session relay method used for the above.

DESCRIPTION OF THE RELATED ART

In the session relaying apparatus and the session relay method thereof, a session means a series of meaningful communication and a packet within the session is to be transmitted and received according to some control policy. It may use a protocol of establishing a connection such as ATM, TCP, SCTP, or UDP and breaking the connection upon completion of the communication.

Figure 6:
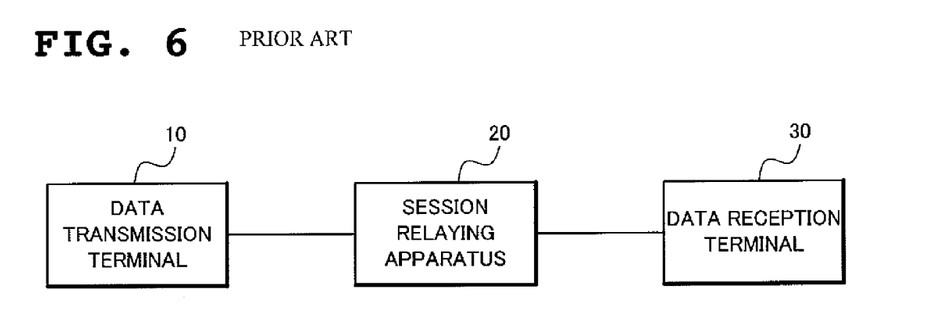
FIG. 6 is a view showing the technical field in which the session relaying apparatus is used.

FIG. 6 is a view showing the technical field in which the session relaying apparatus is used. The following description will be made by using TCP as an example for the sake of convenience.

There has been a method of relaying TCP sessions as one of the techniques for improving throughput of the TCP sessions. In this method, as illustrated in FIG. 6, a session relaying apparatus 20 is put between a data transmission terminal 10 and a data reception terminal 30, so as to relay data with the session divided into a session from the data transmission terminal 10 to the session relaying apparatus 20 and a session from the session relaying apparatus 20 to the data reception terminal 30.

Throughput of the TCP session is determined by RTT (Round Trip Time) and packet loss rate (refer to "Modeling TCP Throughput: A Simple Model and its Empirical Validation", IN ACM SIGCOMM'98 written by Jitendra Padhye, Victor Firoiu, Don Towsley, and Jim Kurose (hereinafter, referred to as Article 2)). The TCP session relay method makes the RTT of one session shorter than the not-relayed communication and decreases the packet loss rate, hence to improve the TCP throughput between the data transmission terminal 10 and the data reception terminal 30 (End-End).

As a method of controlling congestion in this session relaying apparatus, there are methods as shown below.

Figure 7:
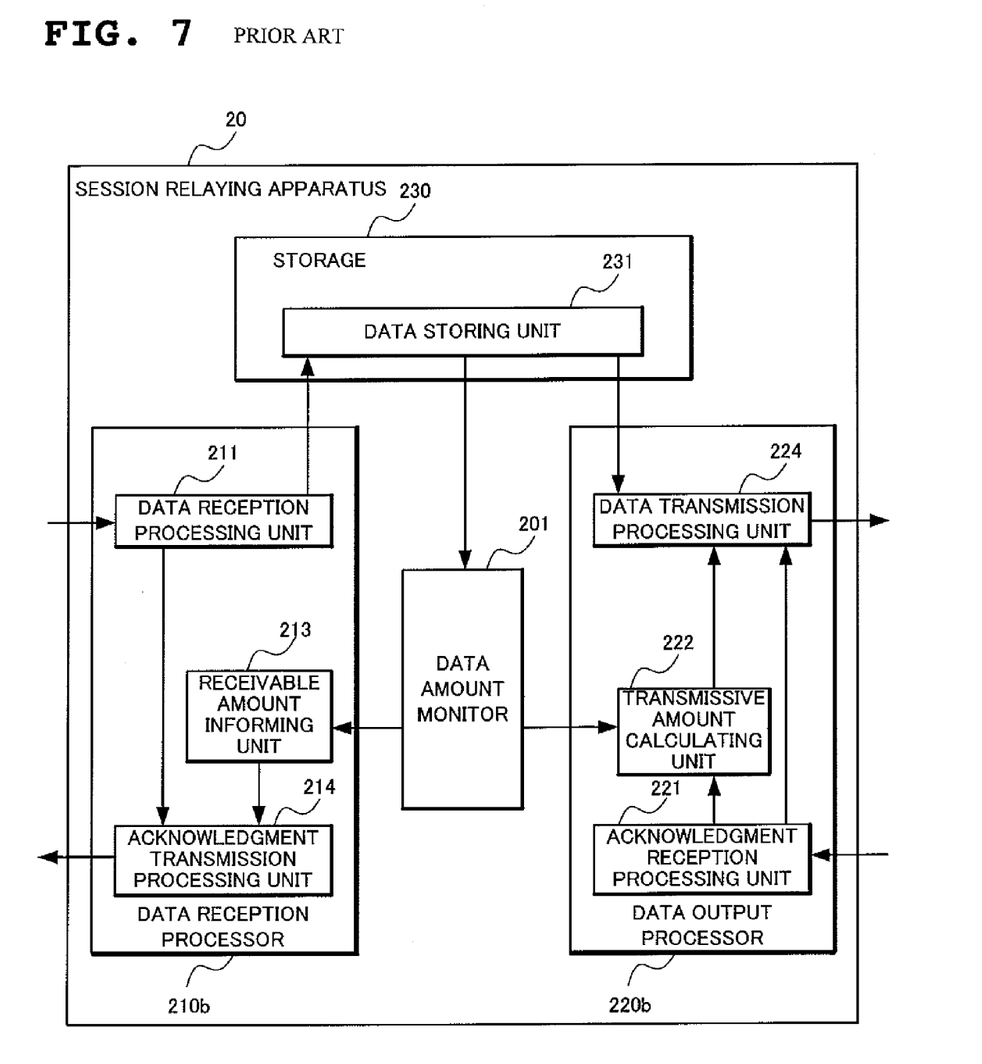
FIG. 7 is a block diagram showing the outline of the data transmission and reception processing by the conventional session relaying apparatus.

FIG. 7 shows a block diagram of the first method.

The first method is a method of using the general TCP used for Linux and BSD in the data reception processing and the data transmission processing of TCP by the session relaying apparatus 20.

In a data receiver 210b which performs the data reception processing in the first method, when data arrives at a data reception processing unit 211 from the data transmission terminal 10, the data reception processing unit 211 stores the data into a data storing unit 231 of a storage 230 and informs an acknowledgement transmission processing unit 214 of the data arrival.

A data amount monitor 201 monitors free space of data within the data storing unit 231 and informs a receivable amount informing unit 213 of the value of the free space. The receivable amount informing unit 213 transmits the value informed by the data amount monitor 201 to the acknowledgement transmission processing unit 214 as receivable amount.

The acknowledgement transmission processing unit 214 creates an acknowledgement signal at a proper timing according to the timing of reception from the data reception processing unit 211 and the receivable amount from the receivable amount informing unit 213 and transmits it to the data transmission terminal 10.

After an acknowledgement reception processing unit 221 receives the acknowledgement signal from the data reception terminal 30, the data transmission processing unit 220b which performs the data transmission processing informs the data transmission processing unit 224 of the data amount receivable by the data reception terminal 30 which is included in the acknowledgement and also informs a transmissive amount calculating unit 222 of the number of the received acknowledgements.

The data amount monitor 201 calculates a time when the data storing unit 231 is empty of data and informs the transmissive amount calculating unit 221 of the result. The data empty time is reset every time when the data storing unit 231 is not empty.

The transmissive amount calculating unit 222 calculates transmissive amount, according to the number of acknowledgements informed by the acknowledgement reception processing unit 221. When the data empty time informed by the data amount monitor 201 exceeds a predetermined time, the transmissive amount is set at "1".

The data transmission processing unit 224 takes out the smallest amount of this transmissive amount, the data amount receivable by the data reception terminal 30, informed by the acknowledgement reception processing unit 221, and the data amount within the data storing unit 231, from the data storing unit 231 and transmits the above to the data reception terminal 30.

The detailed processing of the TCP and IP is described in RFC791, RFC793, RFC2460 and the literature of "TCP/IP illustrated, Volume1: The Protocols" written by W. Richard Stevens, translated by Yasuo Tachibana, supervised by Naoji Inoue (hereinafter, referred to as Literature 4).

The second method is a method of using a special TCP at one or both sides of the TCP session between the data transmission terminal 10 and the session relaying apparatus 20 and the TCP session between the session relaying apparatus 20 and the data reception terminal 30. In the special TCP, when a connection is broken due to some trouble, a resending timer of the connection is initialized. After the connection is established again, it quickly moves to a slow start phase of the TCP (refer to "I-TCP: Indirect TCP for mobile hosts" written by A. V. Barkre and B. Badrinath, in Proceedings of the 15th International Conference on Distributed Computing System, pp. 136-143, May 1995 (hereinafter, referred to as Literature 3)).

The third method is a method disclosed in Japanese Patent Laid-Open No. 2000-253048, in which a special TCP is used at one or both sides of the TCP session between the data transmission terminal 30 and the session relaying apparatus 20 and the TCP session between the session relaying apparatus 20 and the data reception terminal 30, similarly to the second method. Here, the special TCP is a method of performing no congestion control as for resending caused by packet loss between access links (refer to Japanese Patent Laid-Open No. 2000-253048 (hereinafter, referred to as Literature 1)).

The above-mentioned conventional techniques have various problems as follows.

As the first problem, in the above first method, the data storing unit 231 of the session relaying apparatus 20 frequently gets full and the effect of throughput improvement is restrictive.

That is because in the general TCP, the data amount monitor 201 informs the receivable amount informing unit 213 of all the remaining amount within the data storing unit 231 as the receivable amount, in the data reception processing. The data transmission terminal 10 gets into communication, with the receivable amount informed by the session relaying apparatus 20 as the upper limit of the data transmission amount. As the result, empty space of the data storing unit 231 often gets "0". Communication between the data transmission terminal 10 and the session relaying apparatus 20 after the data storing unit 231 gets full resumes when some empty space occurs in the data storing unit 231 while the data amount monitor 201 monitors the data storing unit 231. At this time, the acknowledgement transmission processing unit 214 creates a plurality of acknowledgements and transmits them to the data transmission terminal 10. Because of receiving the acknowledgements having the same number, the data transmission terminal 10 regards them as overlapped ACK and decreases the data transmission amount of the data transmission terminal 10 into half. This deteriorates the throughput between the data transmission terminal 10 and the session relaying apparatus 20 (refer to the Literature 4 and "Transmission control protocol" written by J. Postel, RFC793, September 1981 (hereinafter, referred to as Literature 5)).

As the second problem, in the above-mentioned first method, when there exists a time when the data storing unit 231 of the session relaying apparatus 20 gets empty of data, throughput improvement effect is restrictive.

This is because in the general TCP, the data amount monitor 201 calculates a time when the data storing unit 231 gets empty of data and informs the transmissive amount calculating unit 221 of the result, in the data transmission processing. The transmissive amount calculating unit 222 informs the data transmission processing unit 224 of the transmissive amount "1" when the time informed by the data amount monitor 201 exceeds a predetermined value. In the session relay communication as illustrated in FIG. 6, when congestion occurs between the data transmission terminal 10 and the session relaying apparatus 20, there often occurs an instance when the data amount of the data storing unit 231 within the session relaying apparatus 20 gets "0". As the result, the transmissive amount from the session relaying apparatus 20 to the data reception terminal 30 is decreased without occurrence of congestion between the session relaying apparatus 20 and the data reception terminal 30, which deteriorates the throughput between the session relaying apparatus 20 and the data reception terminal 30 (refer to the Literature 4 and "TCP Congestion Control" written by M. Allman, RCC2581, April 1999 (hereinafter referred to as Literature 6)).

As the third problem, the above-mentioned second and third methods have to alter the terminals.

This is because the general data transmission terminal 10 and data reception terminal 30 can use nothing but the general TCP. The terminals have to be provided with new software and hardware in order to use the special TCP used for the session relaying apparatus 20.

As the fourth problem, the above-mentioned second and third methods cause network congestion within the usual network.

This is because the second and third methods are control methods assuming at least one side of the session relaying apparatus 20 as wireless link and using this characteristic. Therefore, when the second and third methods are used in the usual wired network, even when there occurs packet loss caused by congestion, since the data transmission terminal 10 does not drop the transmission rate, there is a possibility of increasing network congestion further.

SUMMARY OF THE INVENTION

Considering the above problems, an object of the invention is to provide a session relaying apparatus and a session relay method which can restrain deterioration of speed caused by the data storing unit full of data or empty of data.

Another object of the invention is to provide a session relaying apparatus and a session relay method which can restrain deterioration of speed between a session relaying apparatus and a data transmission device and between a session relaying apparatus and a data reception device, without adding new software and hardware to the data transmission terminal and the data reception terminal.

According to the session relaying apparatus and the session relay method of the invention, acknowledgement is created and informed to the data transmission terminal, with a value smaller than the empty space of the data storing unit as a receivable amount. Since the data transmission terminal transmits only the data less than this value, the data storing unit cannot immediately run short of empty space. Therefore, the frequency of the overlapped ACKs occurring every time of filling the data storing unit is decreased, which restrains deterioration of the data transmission amount of a useless data transmission terminal. This can prevent the deterioration of throughput (speed).

According to the session relaying apparatus and the session relay method of the invention, when the data storing unit has had no data for a predetermined period, the initialization judging unit judges whether the size of the transmissive amount from the session relaying apparatus is reduced or not, according to a network situation. While the initialization judging unit judges that the transmissive amount is not initialized, the transmissive amount is not reduced even when there has been the period of having no data in the data storing unit of the session relaying apparatus for a predetermined time. This prevents deterioration of the transmissive amount between a useless session relaying apparatus and the data reception terminal. As the result, deterioration of throughput (speed) can be prevented.

DESCRIPTION OF THE PREFERRED EMBODIMENT

Hereinafter, a first embodiment of the invention will be described in detail referring to the drawings.

(Structure)

Figure 1:
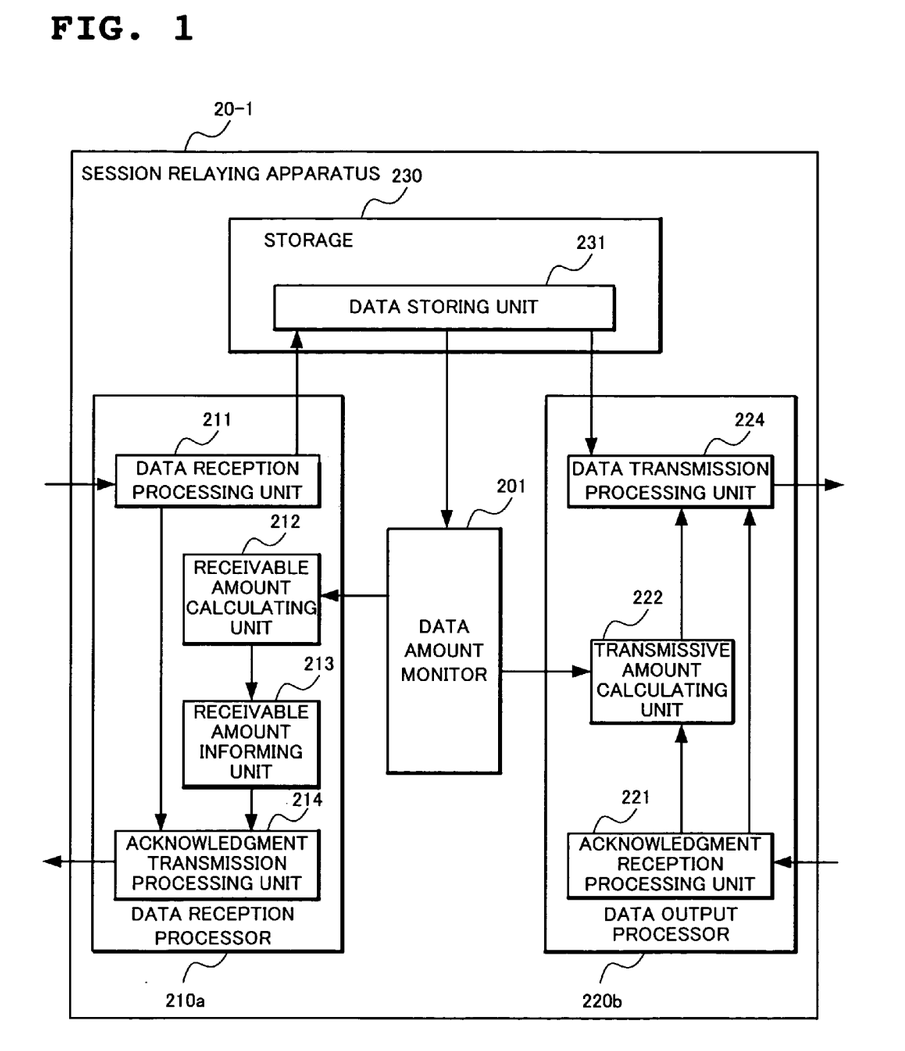
FIG. 1 is a block diagram showing the structure of a session relaying apparatus according to a first embodiment of the invention.

FIG. 1 is a block diagram showing the structure of a session relaying apparatus 20-1 according to the first embodiment of the invention. This Session relaying apparatus 20-1 is to be used as illustrated in FIG. 6.

The session relaying apparatus 20-1 according to the first embodiment includes a data reception processor 210a, a data amount monitor 201, a data output processor 220b, and a storage 230.

The data reception processor 210a further includes a data reception processing unit 211, a receivable amount calculating unit 212, a receivable amount informing unit 213, and an acknowledgement transmission processing unit 214.

The data output processor 220b further includes an acknowledgement reception processing unit 221, a transmissive amount calculating unit 222, and a data transmission processing unit 224. The storage 230 includes a data storing unit 231.

In the first embodiment, the data reception processor 210a performs the data reception processing from the data transmission terminal 10 as follows.

When the data transmission terminal 10 transmits data, the session relaying apparatus 20-1 receives the data in the data reception processing unit 211. The data reception processing unit 211 stores the received data into the data storing unit 231 and informs the acknowledgement transmission processing unit 214 that it has received the data.

While, the data amount monitor 201 calculates data empty space within the data storing unit 231 and informs the receivable amount calculating unit 212 of its value. The receivable amount calculating unit 212 requires a value smaller than the value informed by the data amount monitor 201 as a receivable amount and informs the receivable amount informing unit 213 of the value.

The receivable amount informing unit 213 informs the acknowledgement transmission processing unit 214 of the receivable amount informed by the receivable amount calculating unit 212. The acknowledgement transmission processing unit 214 creates an acknowledgement signal according to the information transmitted from the data reception processing unit 211 and the value of the receivable amount informing unit 213 and transmits it to the data transmission terminal 10.

The data transmission processor 220b from the session relaying apparatus 20-1 to the data reception terminal 30 has the same structure as the conventional session relaying apparatus and it performs the transmission processing by using the existing method such as the conventional first and second methods.

(Operation)

Figure 2:
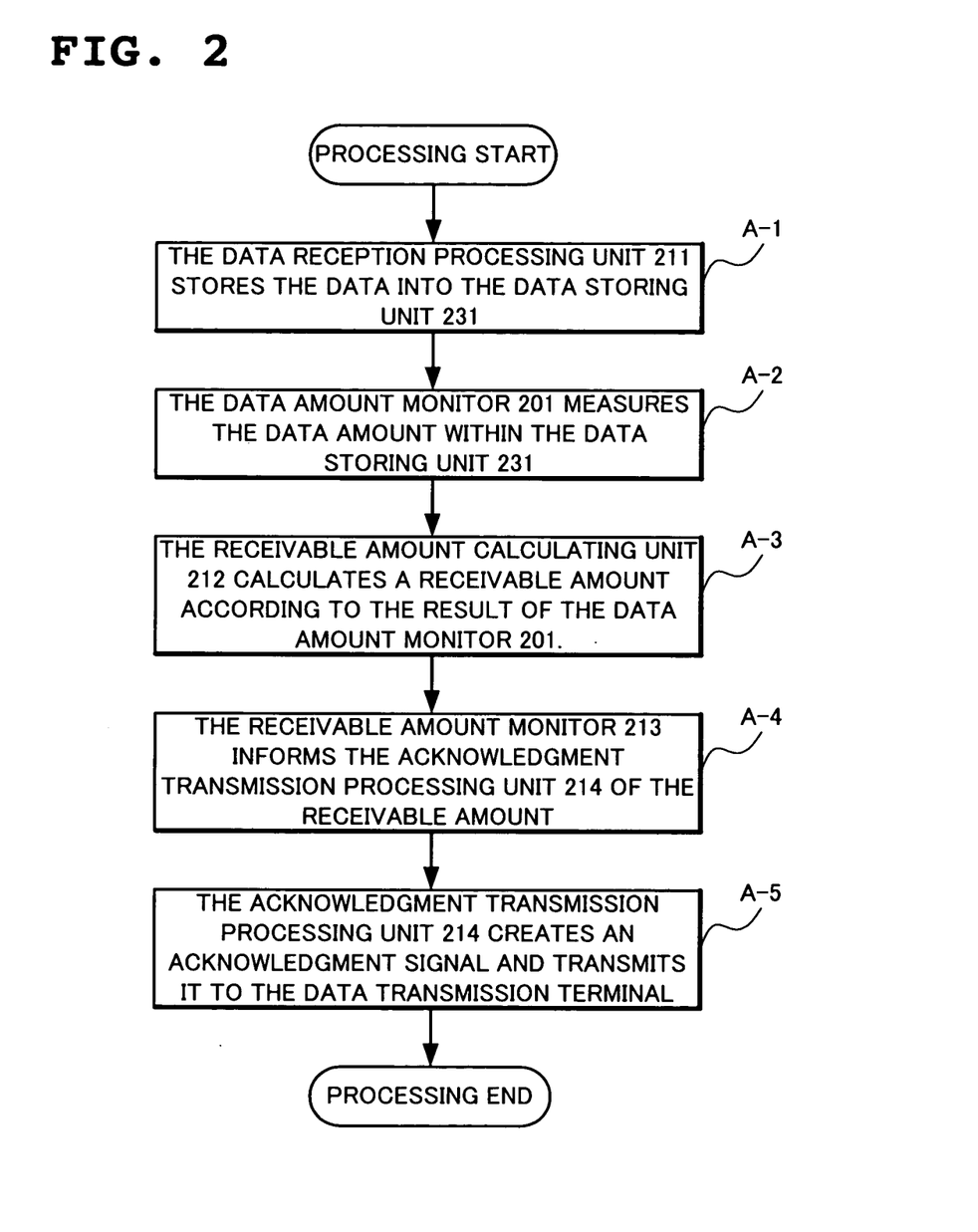
FIG. 2 is a flow chart showing the contents of the data reception processing by the session relaying apparatus according to the first embodiment.

Next, the Operation of the Data Reception processing by the session relaying apparatus 20-1 according to the first embodiment will be described with reference to FIG. 2. FIG. 2 is a flow chart showing the flow of the processing in the data reception processor 210a.

The data reception processor 210a starts the processing when the data from the data transmission terminal 10 arrives at the session relaying apparatus 20-1.

In Step A-1, the data reception processing unit 211 stores the data transmitted from the data transmission terminal 10 into the data storing unit 231 and the processing moves to Step A-2.

In Step A-2, the data amount monitor 201 calculates the data amount within the data amount storing unit 231 and informs the receivable amount calculating unit 212 of the empty space within the data storing unit 231, and the processing moves to Step A-3.

In Step A-3, based on the value informed by the data amount monitor 201, the receivable amount calculating unit 212 calculates a value smaller than the informed amount according to some function as the receivable amount and the processing moves to Step A-4.

In Step A-4, the receivable amount informing unit 213 informs the acknowledgement transmission processing unit 214 of the receivable amount calculated by the receivable amount calculating unit 212 and the processing moves to Step A-5.

In Step A-5, the acknowledgement transmission processing unit 214 makes a judgment about creation of acknowledgement, and when it is necessary to create acknowledgement, it transmits the receivable amount informed by the receivable amount informing unit 213 including the acknowledgement signal to the data transmission terminal 10.

The above is the contents of the processing by the session relaying apparatus 20-1 according to the first embodiment of the invention.

In the conventional technique, the value of the data amount monitor 201 has been used as the receivable amount as it is. As the result, there often occurs the case of filling the data storing unit 231. When the data storing unit 231 is short of empty space, the acknowledgement transmission processing unit 214 transmits the signals having the identical acknowledgement number. As the result, the data transmission terminal 10 drops the transmission rate, which deteriorates communication speed between the data transmission terminal 10 and the session relaying apparatus 20.

On the other hand, in the first embodiment of the invention, the receivable amount calculating unit 212 calculates a value smaller than the value of the data amount monitor 201 as the receivable value and creates the acknowledgement signal using the same value.

Since the data transmission amount from the data transmission terminal 10 is limited to this acknowledgement value as the upper limit, the frequency of running short of empty space within the data storing unit 231 is reduced. As the result, the frequency of the session relaying apparatus 20-1 creating the signals having the identical acknowledgement number is reduced, thereby restraining a decrease in the communication speed between the data transmission terminal 10 and the session relaying apparatus 20-1.

In the first embodiment, as the calculating method of the receivable amount calculating unit 212, the receivable amount calculating unit 212 requires a value smaller than the value informed by the data amount monitor 201 according to some function. As its concrete calculating method, a plurality of thresholds and a plurality of functions are set, when the data amount informed by the data amount monitor 201 is smaller than the smallest threshold, it requires the receivable amount according to the first function, and when the data amount informed by the data amount monitor 201 is between the smallest threshold and the second smallest threshold, it requires the receivable amount according to the second function, and when the data amount informed by the data amount monitor 201 is between the (n−1)th smallest value and the nth smallest value, it requires the receivable amount according to the nth function.

As an example of this function, it may be a value in proportion to one divided by positive number of the informed amount from the data amount monitor 201, or a value in proportion to some value multiplied by positive number of the informed amount from the data amount monitor 201, or a fixed value regardless of the value of the data amount monitor 201, or the receivable amount may be calculated in a combination of these.

Hereinafter, one example of the concrete calculating methods of the receivable amount calculating unit 212 will be described.

When the informed amount from the data amount monitor 201 is more than half of the maximum amount of the data storing unit 231, it uses the first function, while the informed amount is less than half of the maximum amount of the data storing unit 231, it uses the second function. The first function used here is a function for calculating one tenth of the informed amount from the data amount monitor 201 as the receivable amount. The second function is a fixed result from substituting the half of the informed amount from the data amount monitor 201 for the first function or a function for requiring the smaller one of the informed amount from the data amount monitor 201 as the receivable amount.

As for the function for the receivable amount calculating unit 212 calculating the receivable amount, a plurality of functions can be used depending on the informed amount from the data amount monitor 201, but on the boundary between the functions, the receivable amount takes continuous value and a function of decreasing the receivable amount monotonously according as the informed amount from the data amount monitor 201 decreases is selected.

A device with which the session relaying apparatus 20-1 according to the first embodiment is connected is not restricted to the data transmission terminal 10 and the data reception terminal 30, as illustrated in FIG. 6, but it may be another session relaying apparatus.

In the first embodiment, each function of the data reception processor 210a, the data output processor 220b, and the data amount monitor 201 within the session relaying apparatus 20-1 can be realized, for example, by providing a computer with the above-mentioned functions. Specifically, a hardware unit having the above functions may be provided in a computer working as the session relaying apparatus, or a program for achieving the above functions in a way of software may be executed on a computer.

When each function of the data reception processor 210a, the data output processor 220b, and the data amount monitor 201 within the session relaying apparatus 20-1 is realized in a way of software, a session relay program, a program (application) for realizing each function of the above devices is loaded into a program-controlled computer processor (CPU) and executed there. This session relay program is stored into a magnetic disk, semiconductor memory, and the other recording medium and loaded from the recording medium into the computer processor, hence to control the operation of the computer processor, thereby achieving the individual functions inherent in the respective devices.

Second Embodiment

Figure 3:
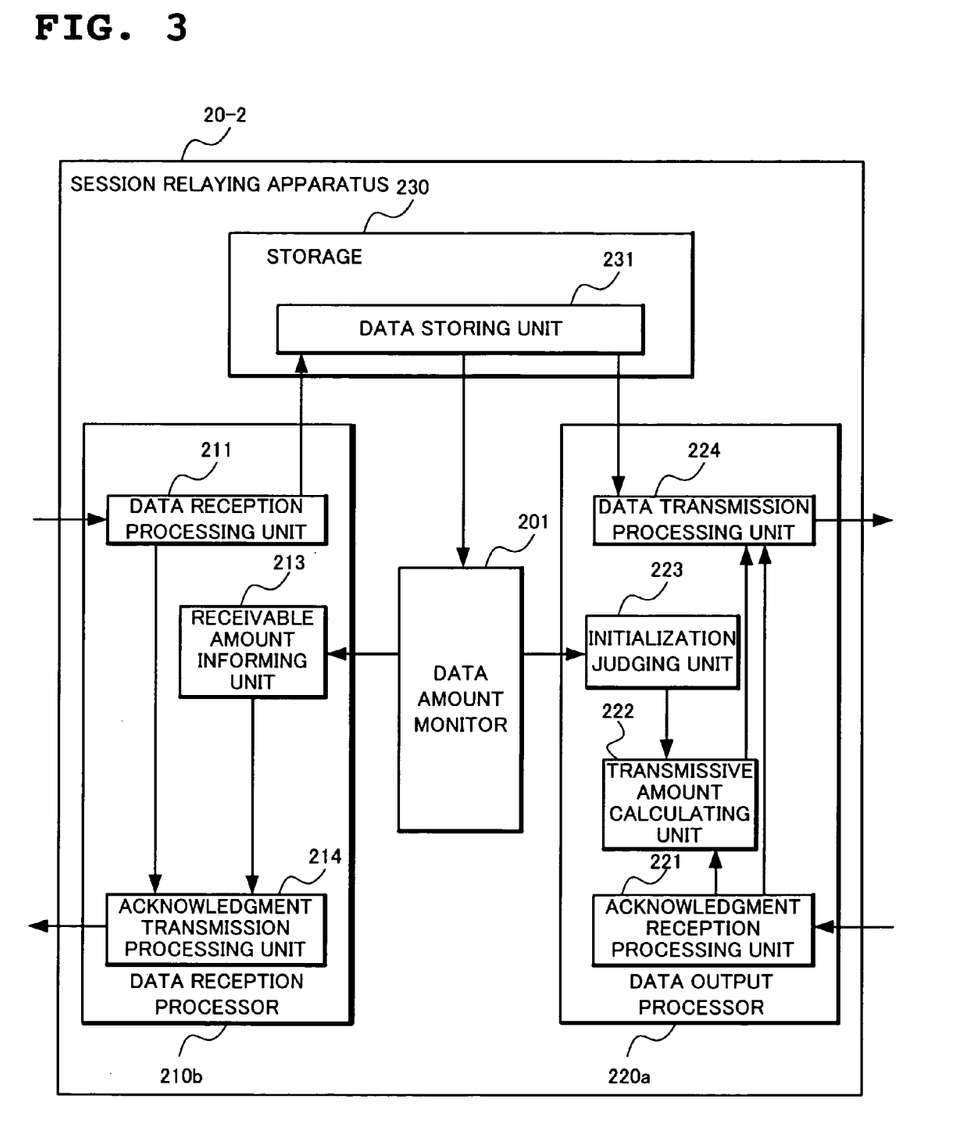
FIG. 3 is a block diagram showing the structure of a session relaying apparatus according to a second embodiment of the invention.

Hereinafter, a second embodiment of the invention will be described in detail referring to the drawings.
(Structure)
FIG. 3 is a block diagram showing the structure of a session relaying apparatus 20-2 according to the second embodiment of the invention.

The session relaying apparatus 20-2 according to the second embodiment comprises a data reception processor 210b, a data amount monitor 201, a data output processor 220a, and a storage 230.

The data reception processor 210b further includes a data reception processing unit 211, a receivable amount informing unit 213, and an acknowledgement transmission processing unit 214.

The data output processor 220a further includes an acknowledgement reception processing unit 221, a transmissive amount calculating unit 222, an initialization judging unit 223, and a data transmission processing unit 224. The storage 230 includes a data storing unit 231.

The data reception processor 210b of the data transmitted from the data transmission terminal 10, in the session relaying apparatus 20-2, according to the second embodiment has the same structure as the conventional session relaying apparatus, and reception processing is performed by using the conventional existing method such as the first method and the second method.

The data output processing by the data output processor 220a, according to the second embodiment, from the session relaying apparatus 20-2 to the data reception terminal 30 will be performed as follows.

Upon reception of the acknowledgement signal transmitted from the data reception terminal 30, the acknowledgement reception processing unit 221 informs the data transmission processing unit 224 of the data amount receivable by the data reception terminal 30, included in the acknowledgement, and informs the transmissive amount calculating unit 222 of the number of the received acknowledgement signals.

The data amount monitor 201 measures the time when the data storing unit 231 is empty of data and informs the initialization judging unit 223 of the result. The time of having empty data is reset every time the data storing unit 231 is not empty.

The initialization judging unit 223 judges whether the transmissive amount is initialized or not, according to the situation of a network and the time informed by the data amount monitor 201 and informs the transmissive amount calculating unit 222 of the result.

Figure 4:
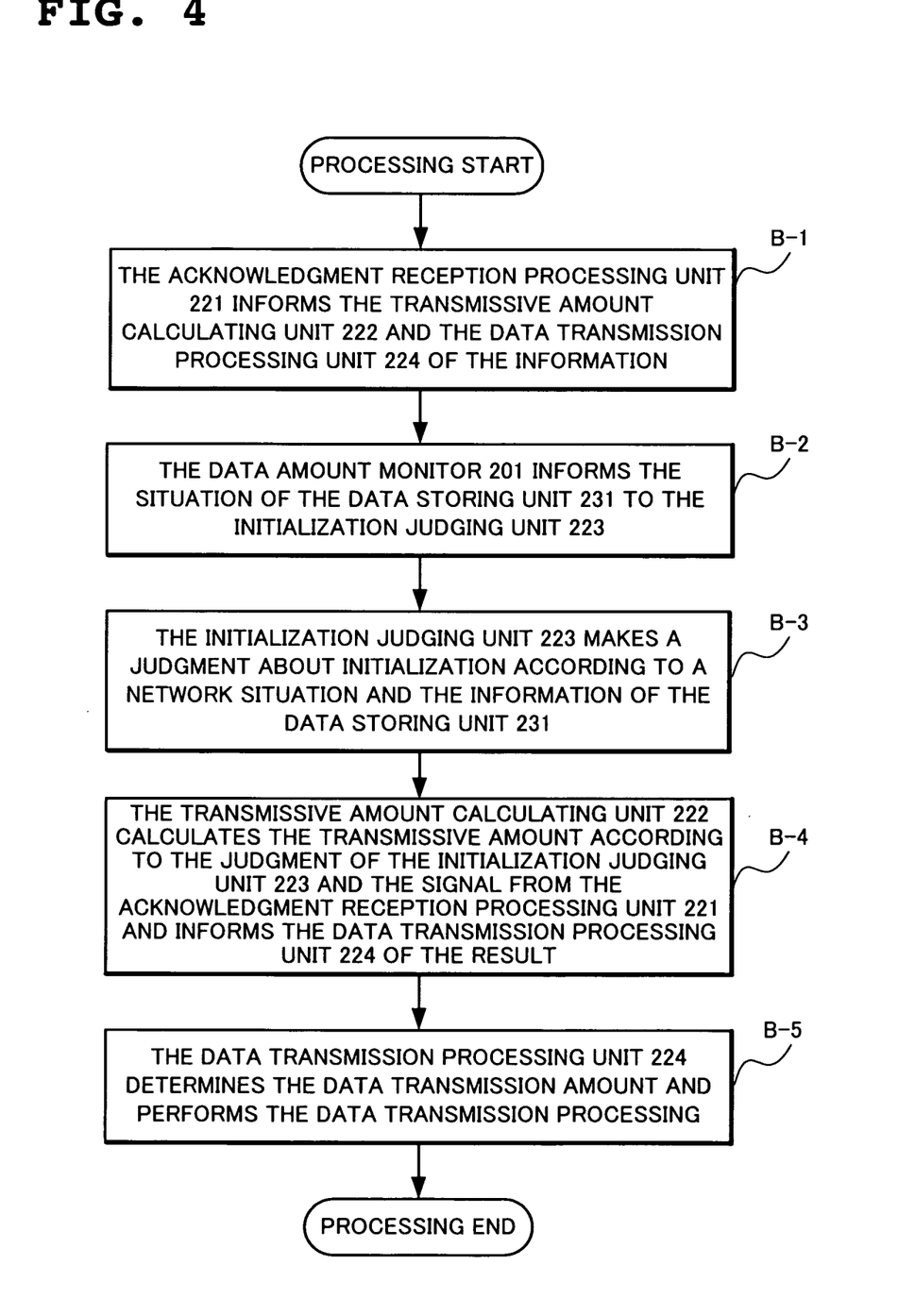
FIG. 4 is a flow chart showing the contents of the data transmission processing by the session relaying apparatus according to the second embodiment.

The transmissive amount calculating unit 222 calculates the transmissive amount, according to the number of acknowledgements informed by the acknowledgement reception processing unit 221. When the judgment result informed by the initialization judging unit 223 is to initialize the transmissive amount, the transmissive amount is set at "1". The data transmission processing unit 224 takes out the smallest amount of this transmissive amount, the data amount receivable by the data reception terminal 30, informed by the acknowledgement reception processing unit 221, and the data amount within the data storing unit, from the data storing unit 231 and transmits the above to the data reception terminal 30.
(Operation)
Next, the Operation of the Data Transmission processing by the session relaying apparatus 20-2 according to the second embodiment will be described referring to FIG. 4. FIG. 4 shows the processing by the data transmission processing unit 220a under data communication.

Under the data communication, the processing starts when the acknowledgement signal from the data reception terminal 30 arrives at the session relaying apparatus 20-2.

In Step B-1, the acknowledgement reception processing unit 221 receives the acknowledgement signal transmitted from the data reception terminal 30, informs the transmissive amount calculating unit 222 of the information such as the number of the acknowledgements, and informs the data transmission processing unit 224 of the information such as the data amount receivable by the data reception terminal 30, included in the acknowledgement, and the processing moves to Step B-2.

In Step B-2, the data amount monitor 201 monitors the state of the data storing unit 231 and informs the initialization judging unit 223 of the time when the data amount is empty, and the processing moves to Step B-3.

In Step B-3, the initialization judging unit 223 judges whether the transmissive amount is initialized or not, according to the time when the data storing unit 231 is empty of data, informed by the data amount monitor 201 and the situation of the network. It informs the transmissive amount calculating unit 222 of the result and the processing moves to Step B-4.

In Step B-4, the transmissive amount calculating unit 222 calculates the transmissive amount, according to the result of the initialization judgment by the initialization judging unit 223 and the number of acknowledgement signals from the acknowledgement reception processing unit 221 and informs the data transmission terminal 224 of the result. Thereafter, the processing moves to Step B-5.

In Step B-5, the data transmission processing unit 224 determines the transmission data amount, according to the transmissive amount informed by the transmissive amount calculating unit 222, the receivable amount by the data reception terminal 3 informed by the acknowledgement reception processing unit 221, and the data amount of the data storing unit 231 and transmits the data to the data reception terminal 3.

The above is the contents of the processing by the session relaying apparatus 20-2 according to the second embodiment of the invention.

In the conventional technique, the time when the data storing unit 231 is empty, informed by the data amount monitor 201 is directly informed to the transmissive amount calculating unit 222. The transmissive amount calculating unit 222 reduces the transmissive amount to "1" when the above time when the data storing unit 231 is empty reaches a predetermined value, regardless of the situation of the network. Since there occurs temporary congestion between the data transmission terminal 10 and the session relaying apparatus 20, even when there exists the time when the data storing unit 231 gets empty of data, the transmissive amount is reduced, which causes a decrease in the communication speed between the session relaying apparatus 20 and the data reception terminal 30.

While, in the second embodiment of the invention, the time when the data storing unit 231 gets empty of data, informed by the data amount monitor 201, is informed to the initialization judging unit 223. The initialization judging unit 223 judges whether the transmission amount is initialized or not, considering the information of the data amount monitor 201 and the situation of the network.

As the result, there occurs the case of judging that the transmissive amount is not reduced even when the data storing unit 231 gets empty of data temporarily. This can restrain a decrease in the communication speed between the session relaying apparatus 20-2 and the data reception terminal 30.

In the second embodiment, as a concrete example about the network situation to be considered by the initialization judging unit 223, whether the transmissive amount is reduced or not, is judged, according to the information which can specify a user such as the IP address, the ID of VLAN, and the MAC address, the information which can specify an application such as the port number of TCP, and the information which can specify the priority of data such as the TOS field in the IP header, the priority within the VLAN header, and the priority within the MPLS header.

As another situation of a network, the transmissive amount is judged to be initialized in the case where the time when the data storing unit 231 gets empty of data exceeds a predetermined value set in the session relaying apparatus 20.

As another network situation, the session relaying apparatus 2 sets each time as for the information for specifying a user, the information for specifying an application, and the information for specifying the priority of data, and in the case where the time when the data storing unit 231 gets empty of data exceeds its value, whether the transmissive amount is initialized or not, is judged.

A device with which the session relaying apparatus 20-2 according to the second embodiment is connected is not restricted to the data transmission terminal 10 and the data reception terminal 30, as illustrated in FIG. 6, but it may be another session relaying apparatus.

In the second embodiment, each function of the data reception processor 210b, the data output processor 220a, and the data amount monitor 201 within the session relaying apparatus 20-2 can be realized, for example, by providing a computer with the above-mentioned functions. Specifically, a hardware unit having the above functions may be provided in a computer working as the session relaying apparatus, or a program for achieving the above functions in a way of software may be executed on a computer.

When each function of the data reception processor 210b, the data output processor 220a, and the data amount monitor 201 within the session relaying apparatus 20-2 is realized in a way of software, a session relay program, a program (application) for realizing each function of the above devices is loaded into a program-controlled computer processor (CPU) and executed there. This session relay program is stored into a magnetic disk, semiconductor memory, and the other recording medium and loaded from the recording medium into the computer processor, hence to control the operation of the computer processor, thereby achieving the individual functions inherent in the respective devices.

Third Embodiment

Hereinafter, a third embodiment of the invention will be described in detail referring to the drawings.
(Structure)

Figure 5:
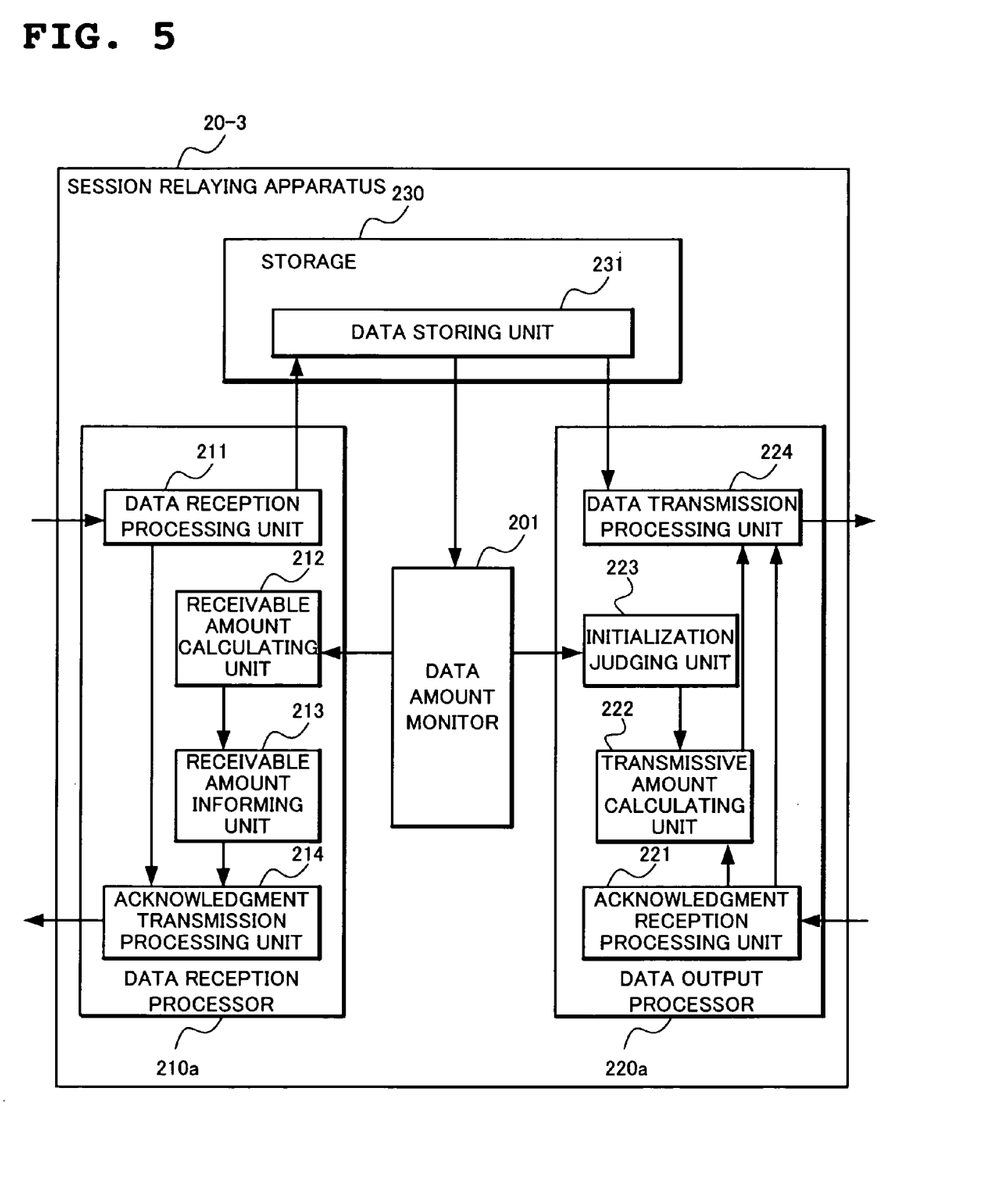
FIG. 5 is a block diagram showing the structure of a session relaying apparatus according to a third embodiment of the invention.

FIG. 5 is a block diagram showing the structure of a session relaying apparatus according to the third embodiment of the invention.

The session relaying apparatus 20-3 according to the third embodiment comprises a data reception processor 210a, a data amount monitor 201, a data output processor 220a, and a storage 230.

The data reception processor 210a further includes a data reception processing unit 211, a receivable amount calculating unit 212, a receivable amount informing unit 213, and an acknowledgement transmission processing unit 214.

The data output processor 220a includes an acknowledgement reception processing unit 221, a transmissive amount calculating unit 222, an initialization judging unit 223, and a data transmission processing unit 224. The storage 230 includes a data storing unit 231.

In the third embodiment, the data reception processor 210a within the session relaying apparatus 20-3 performs the reception processing of the data transmitted from the data transmission terminal 10, by using the method of the first embodiment of the invention and the data output processor 220a performs the transmission processing of the data from the session relaying apparatus 20-3 to the data reception terminal 30, by using the method of the second embodiment of the invention.

(Operation)

The Data Reception Processing by the Session relaying apparatus 20-3 according to the third embodiment is as illustrated in FIG. 2 having been described in the first embodiment, and the data transmission processing is as illustrated in FIG. 4 having been described in the second embodiment. Since the operation of the data reception processor 210a according to the third embodiment is the same as that of the data reception processing according to the first embodiment and the operation of the data output processor 220a according to the third embodiment is the same as that of the data transmission processing according to the second embodiment, its description is omitted.

In the conventional data reception processing, the value of the data amount monitor 201 was used as the receivable amount as it is. This increased the case of filling the data storing unit 231. When the data storing unit 231 was short of empty space, the acknowledgement transmission processing unit 214 transmitted the signals having the identical number. Thus, the data transmission terminal 10 dropped the transmission rate, which deteriorated communication speed between the data transmission terminal 10 and the session relaying apparatus 20.

In the data transmission processing, the time when the data storing unit 231 was empty, informed by the data amount monitor 201, was directly informed to the transmissive amount calculating unit 222. As the result, in the case where the time when the data storing unit 231 was empty reached a predetermined value, the transmissive amount calculating unit 222 reduced the transmissive amount to "1", regardless of the situation of the network. Then, temporary congestion occurred between the data transmission terminal 10 and the session relaying apparatus 20, and since the transmissive amount was reduced even when there existed the time when the data storing unit 231 was empty of data, the communication speed between the session relaying apparatus 20 and the data reception terminal 30 was deteriorated.

In the third embodiment, the receivable amount calculating unit 212 requires a receivable amount of the data reception processing to take a value smaller than the value of the data amount monitor 201 and creates an acknowledgement signal by using the above value. Since the data transmission amount from the data transmission terminal 1 is restricted to the value of this acknowledgement as the upper limit, the frequency of running short of empty space in the data storing unit 231 is decreased. In addition, the frequency of creating the signals having the identical number in the session relaying apparatus 2 is decreased, thereby restraining deterioration in communication speed between the data transmission terminal 10 and the session relaying apparatus 20.

In the data transmission processing, the time when the data storing unit 231 is empty, informed by the data amount monitor 201, is informed to the initialization judging unit 223. The initialization judging unit 223 judges whether the transmission amount is initialized or not, considering both the information of the data amount monitor 201 and the network situation. As the result, there occurs the case where it is judged that the transmissive amount is not reduced even when the data storing unit 231 is temporarily empty. Therefore, it is possible to restrain deterioration in communication speed between the session relaying apparatus 20 and the data reception terminal 30.

As the calculating method by the receivable amount calculating unit 212 in the third embodiment, as described in the first embodiment, receivable amount is set at a value smaller than the value informed by the data amount monitor 201, according to some function. More specifically, a plurality of thresholds and a plurality of functions are set, and when the data amount informed by the data amount monitor 201 is smaller than the smallest threshold, receivable amount is calculated according to the first function, when the data amount informed by the data amount monitor 201 is between the smallest threshold and the second smallest threshold, receivable amount is calculated according to the second function, and when the data amount informed by the data amount monitor 201 is between the (n−1)th smallest value and the nth smallest value, receivable amount is calculated according to the nth function.

In the third embodiment, as the judging criterion about the network situation by the initialization judging unit 223, as having been described in the second embodiment, there are a method of judging whether the transmissive amount is reduced or not, according to the information which can specify a user such as the IP address, the ID of VLAN, and the MAC address, the information which can specify an application such as the port number of TCP, and the information which can specify the priority of data such as the TOS field in the IP header, the priority within the VLAN header, and the priority within the MPLS header; a method of judging that the transmissive amount is initialized, in the case where the time when the data storing unit 231 gets empty of data exceeds a predetermined value set in the session relaying apparatus 20-3; and a method of judging that the transmissive amount is initialized or that it is not initialized in the case where the time when the data storing unit 231 gets empty of data exceeds the value, with each time set for the information for specifying a user, the information for specifying an application, and the information for specifying the priority of data in the session relaying apparatus 20-3.

A device with which the session relaying apparatus 20-3 according to the third embodiment is connected is not restricted to the data transmission terminal 10 and the data reception terminal 30, as illustrated in FIG. 6, but it may be another session relaying apparatus.

In the third embodiment, each function of the data reception processor 210a, the data output processor 220a, and the data amount monitor 201 within the session relaying apparatus 20-3 can be realized, for example, by providing a computer with the above-mentioned functions. Specifically, a hardware unit having the above functions may be provided in a computer working as the session relaying apparatus, or a program for achieving the above functions in a way of software may be executed on a computer.

When each function of the data reception processor 210a, the data output processor 220a, and the data amount monitor 201 within the session relaying apparatus 20-3 is realized in a way of software, a session relay program, a program (application) for realizing each function of the above devices is loaded into a program-controlled computer processor (CPU) and executed there. This session relay program is stored into a magnetic disk, a semiconductor memory, and the other recording medium and loaded from the recording medium into the computer processor, hence to control the operation of the computer processor, thereby achieving the individual functions inherent in the respective devices.

As set forth hereinabove, although the invention has been described with preferred embodiments, it is not restricted to the above embodiments. It is needless to say that various modifications can be made without departing from the spirit of the invention.

According to the invention, the following good effects can be achieved.

As the first effect of the invention, it is possible to restrain deterioration in speed between the data transmission terminal and the session relaying apparatus, caused by filling the data storing unit within the session relaying apparatus.

This is because the receivable amount calculating unit requires the receivable amount to take a value smaller than the data amount receivable by the session relaying apparatus in order not to fill the data storing unit within the session relaying apparatus so frequently.

As the second effect, it is possible to restrain deterioration in speed between the session relaying apparatus and the data reception device, caused by the data storing unit's getting empty within the session relaying apparatus.

This is because even when there exists the time when the data storing unit within the session relaying apparatus gets empty of data, when the initialization judging unit judges that the data is not initialized, transmissive amount is not reduced.

As the third effect, it is possible to restrain deterioration in speed between the session relaying apparatus and the data transmission device and between the session relaying apparatus and the data reception device, without adding new software and hardware to the data transmission terminal and the data reception terminal.

What is claimed is:

1. A session relay method for relaying a session between a data transmission terminal and a data reception terminal, comprising:
    monitoring data amount within a data storing unit;
    setting a plurality of thresholds for an empty data amount in said data storing unit;
    calculating a receivable amount for respective ranges of said plurality of thresholds so that the receivable amount comprises smaller than the empty data amount being calculated from the data amount by using a plurality of functions each of which are set for respective ranges of said plurality of thresholds;
    informing the data transmission terminal of the receivable amount;
    judging whether to reduce a transmissive amount based on a network situation when the data storing unit continues to be empty for a predetermined period of time, and
    when the transmissive amount is not reduced as a result of the judging, determining the transmissive amount based on the receivable amount.

2. A session relay method for relaying a session between a data transmission terminal and a data reception terminal, comprising:
    measuring time while a data storing unit is empty;
    judging whether a transmission amount is reduced or not, based on a length of the measured time and a network situation relating to throughput for a data transmission;
    determining a transmissive amount based on the judgment;
    judging whether the transmissive amount is initialized or not based on the network situation when the data storing unit continues to be empty for a predetermined period, and
    when the transmissive amount is not reduced as a result of the judging, determining the transmissive amount based on a receivable amount.

3. A session relay method for relaying a session between a data transmission terminal and a data reception terminal, comprising:
    monitoring data amount within a data storing unit and measuring time while the data storing unit is empty;
    setting a plurality of thresholds for empty data amount in said data storing unit,
    calculating a receivable amount for respective ranges of said plurality of thresholds so that the receivable amount comprises smaller than empty data amount being calculated from the data amount by using a plurality of functions each of which are set for respective ranges of said plurality of thresholds, and informing the data transmission terminal of the received amount;
    judging whether a transmission amount is reduced or not, based on length of the measured time and a network situation relating to throughput for a data transmission, and determining a transmissive amount based on the judgment;
    judging whether the transmissive amount is initialized or not based on the network situation when the data storing unit continues to be empty for a predetermined period; and
    when the transmissive amount is not reduced as a result of the judging, determining the transmissive amount based on the receivable amount.

4. The session relay method as set forth in claim 1 or claim 3, comprising:
    setting a plurality of thresholds for the empty data amount and
    determining the receivable amount with respect to respective ranges being determined by the thresholds,
    wherein the receivable amount is proportional to a value being calculated by dividing the empty data amount by a positive number or a value being calculated by multiplying the empty data amount by a positive number, or is a predetermined value less than the empty data amount.

5. The session relay method as set forth in claim 1 or claim 3, comprising:
    setting a plurality of thresholds for the empty data amount and
    calculating the receivable amount with a plurality of functions each of which are set with respect to respective ranges being determined by the thresholds, wherein each of the functions decreases the receivable amount according to a decrease in the empty data amount and each of the functions are continuous with each other.

6. The session relay method as set forth in claim 2 or claim 3, comprising:
    judging whether the transmissive amount is reduced or not based on the time and the network situation,
    wherein the network situation includes information for specifying at least one of a user, an application, or priority of data,
    wherein information for specifying the user comprises IP address, ID of VLAN, or MAC address,
    wherein information for specifying the application comprises port number of TCP, and
    wherein information for specifying priority of data comprises a TOS field in an IP header, a priority in a VLAN header, or a priority in a MPLS header.

7. The session relay method as set forth in claim 2 or claim 3, comprising:
    judging whether the transmissive amount is initialized or not based on the network situation when the data storing unit continues to be empty for a predetermined period,
    wherein the network situation includes information for specifying at least one of a user, an application, or priority of data,
    wherein the information for specifying the user comprises IP address, ID of VLAN, or MAC address, wherein information for specifying the application comprises port number of TCP, and
wherein information for specifying priority of data comprises a TOS field in a IP header, a priority in a VLAN header, or a priority in a MPLS header.

8. A session relaying apparatus for relaying a session between a data transmission terminal and a data reception terminal, comprising:
a monitoring unit which monitors a data amount within a data storing unit;
a calculating unit, implemented by a processor, which calculates a receivable amount so that the receivable amount comprises smaller than empty data amount being calculated from the data amount;
an informing unit which informs the data transmission terminal of the receivable amount; and
a judging unit which judges whether to reduce a transmissive amount based on a network situation when the data storing unit continues to be empty for a predetermined period of time,
wherein the calculation unit determines the transmissive amount based on the receivable amount, when the transmissive amount is not reduced as a result of the judging,
wherein a plurality of thresholds is set for the empty data amount in said data storing unit and the receivable amount is calculated for respective ranges of said plurality of thresholds by using a plurality of functions each of which are set for respective ranges of said plurality of thresholds.

9. A session relaying apparatus for relaying a session between a data transmission terminal and a data reception terminal, comprising:
a measuring unit which measures time while a data storing unit is empty;
an initialization judging unit, implemented by a processor, which judges whether a transmission amount is reduced or not based on a length of the measured time and a network situation relating to throughput for a data transmission; and
a determining unit which determines a transmissive amount based on the judgment,
wherein the initialization judging unit judges whether the transmissive amount is initialized or not based on the network situation when the data storing unit continues to be empty for a predetermined period and a calculating unit determines the transmissive amount based on the receivable amount, when the transmissive amount is not reduced as a result of the judging.

10. A session relaying apparatus for relaying a session between a data transmission terminal and a data reception terminal, comprising:
a monitoring unit which monitors a data amount within a data storing unit;
a calculating unit, implemented by a processor, which calculates a receivable amount so that the receivable amount comprises smaller than empty data amount being calculated from the data amount;
an informing unit which informs the data transmission terminal of the receivable amount;
a measuring unit which measures time while the data storing unit is empty;
an initialization judging unit which judges whether a transmission amount is reduced or not based on a length of the measured time and a network situation relating to throughput for a data transmission; and
a determining unit which determines a transmissive amount based on the judgment,
wherein a plurality of thresholds is set for the empty data amount in said data storing unit and the receivable amount is calculated for respective ranges of said plurality of thresholds by using a plurality of functions each of which are set for respective ranges of said plurality of thresholds, and
wherein the initialization judging unit judges whether the transmissive amount is initialized or not based on the network situation when the data storing unit continues to be empty for a predetermined period and the calculating unit determines the transmissive amount based on the receivable amount, when the transmissive amount is not reduced as a result of the judging.

11. The session relaying apparatus as set forth in claim 8 or claim 10, wherein
a plurality of thresholds are set for the empty data amount and determining the receivable amount with respect to respective ranges being determined by the thresholds,
wherein the receivable amount is proportional to a value being calculated by dividing the empty data amount by a positive number or a value being calculated by multiplying the empty data amount by a positive number, or is a predetermined value less than the empty data amount.

12. The session relaying apparatus as set forth in claim 8 or claim 10, wherein
a plurality of thresholds are set for the empty data amount and
the receivable amount is calculated with a plurality of functions each of which are set with respect to respective ranges being determined by the thresholds, wherein each of the functions decreases the receivable amount according to a decrease in the empty data amount and each of the functions are continuous with each other.

13. The session relaying apparatus as set forth in claim 9 or claim 10,
wherein the network situation includes information for specifying at lest one of a user, an application, or priority of data,
wherein information for specifying the user comprises IP address, ID of VLAN, or MAC address,
wherein information for specifying the application comprises port number of TCP, and
wherein information for specifying priority of data comprises a TOS field in an IP header, a priority in a VLAN header, or a priority in a MPLS header.

14. The session relaying apparatus as set forth in claim 9 or claim 10, wherein
the initialization judging unit judges whether the transmissive amount is initialized or not based on the network situation when the data storing unit continues to be empty for a predetermined period,
wherein the network situation includes information for specifying at least one of a user, an application or priority of data,
wherein information for specifying the user comprises IP address, ID of VLAN, or MAC address,
wherein information for specifying the application comprises port number of TCP, and
wherein information for specifying priority of data comprises a TOS field in a IP header, a priority in a VLAN header, or a priority in a MPLS header.

15. A non-transitory computer readable medium storing instructions readable by a computer for performing a method for relaying a session between a data transmission terminal and a data reception terminal, the method comprising:

monitoring a data amount within a data storing unit,
setting a plurality of thresholds for an empty data amount in said data storing unit;
calculating a receivable amount for respective ranges of said plurality of thresholds so that the receivable amount comprises smaller than empty data amount being calculated from the data amount by using a plurality of functions each of which are set for respective ranges of said plurality of thresholds;
informing the data transmission terminal of the receivable amount;
judging whether to reduce a transmissive amount based on a network situation when the data storing unit continues to be empty for a predetermined period of time, and
when the transmissive amount is not reduced as a result of the judging, determining the transmissive amount based on the receivable amount.

16. A non-transitory computer readable medium storing instructions readable by a computer for performing a method for relaying a session between a data transmission terminal and a data reception terminal, the method comprising:
   measuring time while a data storing unit is empty;
   judging whether a transmission amount is reduced or not, based on a length of the measured time and a network situation relating to throughput for a data transmission;
   determining a transmissive amount based on the judgment;
   judging whether the transmissive amount is initialized or not based on the network situation when the data storing unit continues to be empty for a predetermined period, and
   when the transmissive amount is not reduced as a result of the judging, determining the transmissive amount based on the receivable amount.

17. A non-transitory computer readable medium storing instructions readable by a computer for performing a method for relaying a session between a data transmission terminal and a data reception terminal, the method comprising:
   monitoring data amount within a data storing unit;
   measuring time while the data storing unit is empty;
   setting a plurality of thresholds for an empty data amount in said data storing unit;
   calculating a receivable amount for respective ranges of said plurality of thresholds so that the receivable amount comprises smaller than empty data amount, which is calculating from the data amount, and informing the data transmission terminal of the receivable amount by using a plurality of functions each of which are set for respective ranges of said plurality of thresholds;
   judging whether a transmission amount is reduced or not, based on a length of the measured time and a network situation relating to throughput for a data transmission;
   determining a transmissive amount based on the judgment;
   judging whether the transmissive amount is initialized or not based on the network situation when the data storing unit continues to be empty for a predetermined period, and
   when the transmissive amount is not reduced as a result of the judging, determining the transmissive amount based on the receivable amount.

18. The non-transitory computer readable medium as set forth in claim 15 or claim 17, comprising:
   setting a plurality of thresholds for the empty data amount; and
   determining the receivable amount with respect to respective ranges being determined by the thresholds,
   wherein the receivable amount is proportional to a value being calculated by dividing the empty data amount by a positive number or a value being calculated by multiplying the empty data amount by a positive number, or is a predetermined value less than the empty data amount.

19. The non-transitory computer readable medium as set forth in claim 15 or claim 17, comprising:
   setting a plurality of thresholds for the empty data amount and
   calculating the receivable amount with a plurality of functions each of which are set with respect to respective ranges being determined by the thresholds, wherein each of the functions decreases the receivable amount according to a decrease in the empty data amount, and each of the functions are continuous with each other.

20. The non-transitory computer readable medium as set forth in claim 16 or claim 17, comprising:
   judging whether the transmissive amount is reduced or not based on the time and the network situation,
   wherein the network situation includes information for specifying at least one of a user, an application, or priority of data,
   wherein information for specifying the user comprises IP address, ID of VLAN, or MAC address,
   wherein information for specifying the application comprises port number of TCP, and
   wherein information for specifying priority of data comprises a TOS field in an IP header, a priority in a VLAN header, or a priority in a MPLS header.

21. The non-transitory computer readable medium as set forth in claim 16 or claim 17, comprising:
   judging whether the transmissive amount is initialized or not based on the network situation when the data storing unit continues to be empty for a predetermined period,
   wherein the network situation includes information for specifying at least one of a user, an application, or priority of data,
   wherein information for specifying the user comprises IP address, ID of VLAN, or MAC address,
   wherein information for specifying the application comprises port number of TCP, and
   wherein information for specifying priority of data comprises a TOS field in a IP header, a priority in a VLAN header, or a priority in a MPLS header.

* * * * *